United States Patent [19]

Miller et al.

[11] Patent Number: 5,265,324
[45] Date of Patent: Nov. 30, 1993

[54] METHOD OF MAKING A SENSING EDGE

[75] Inventors: Bearge D. Miller, Concordville, Pa.; Vernon P. King, Parma, Mich.

[73] Assignee: Miller Edge, Inc., Concordville, Pa.

[21] Appl. No.: 14,480

[22] Filed: Feb. 8, 1993

Related U.S. Application Data

[62] Division of Ser. No. 881,930, May 12, 1992, Pat. No. 5,225,640.

[51] Int. Cl.$^5$ ............................................. H01H 11/00
[52] U.S. Cl. ....................................... 29/622; 29/849; 29/850; 156/243; 156/244.25; 425/131.1
[58] Field of Search ................ 29/622, 848, 849, 850; 156/243, 244.25; 200/61.43; 425/131.1, 382 R

[56] References Cited

U.S. PATENT DOCUMENTS

| | | | |
|---|---|---|---|
| 3,462,885 | 8/1969 | Miller | 49/488 |
| 3,843,475 | 2/1972 | Kent | 156/244.25 |
| 3,867,595 | 2/1975 | Ramsey et al. | 200/86 R |
| 4,045,631 | 8/1977 | Dann | 200/61.43 |
| 4,051,336 | 9/1977 | Miller | 200/61.43 |
| 4,080,519 | 3/1978 | Michalson | 200/86 R |
| 4,115,952 | 9/1978 | French | 200/61.43 |
| 4,200,777 | 4/1980 | Miller | 200/85 A |
| 4,273,974 | 6/1981 | Miller | 200/61.43 |
| 4,349,710 | 9/1982 | Miller | 200/245 |
| 5,066,835 | 11/1991 | Miller et al. | 200/61.43 |
| 5,079,417 | 1/1992 | Strand | 250/221 |

Primary Examiner—P. W. Echols
Attorney, Agent, or Firm—Panitch Schwarze Jacobs & Nadel

[57] ABSTRACT

The present invention includes a sensing edge for controlling movement of a door by actuation of a device upon force being applied to the sensing edge. The sensing edge includes a base member for being secured to the leading edge of a door and a sheath having a plurality of internal cavities extending therethrough for receiving electrical contacts and wiring. A method of making the sensing edge includes coextrusion of the base member and sheath. During the coextrusion process, electrical contacts are positioned within and bonded to the sheath. Electrical wiring may also be positioned within one or more cavities within the sheath during the coextrusion process.

7 Claims, 9 Drawing Sheets

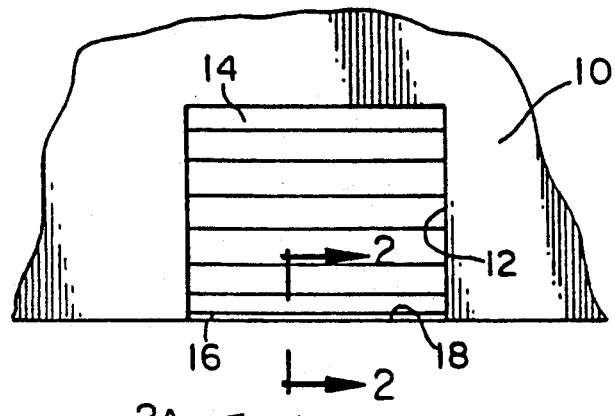
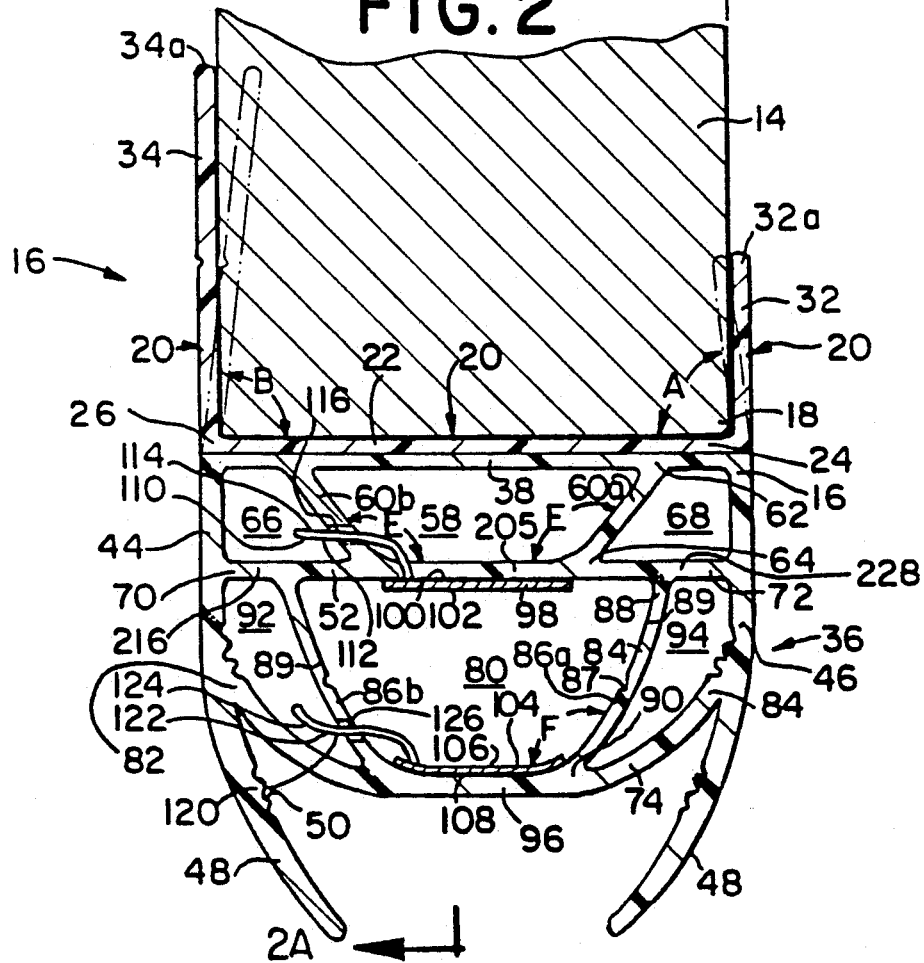

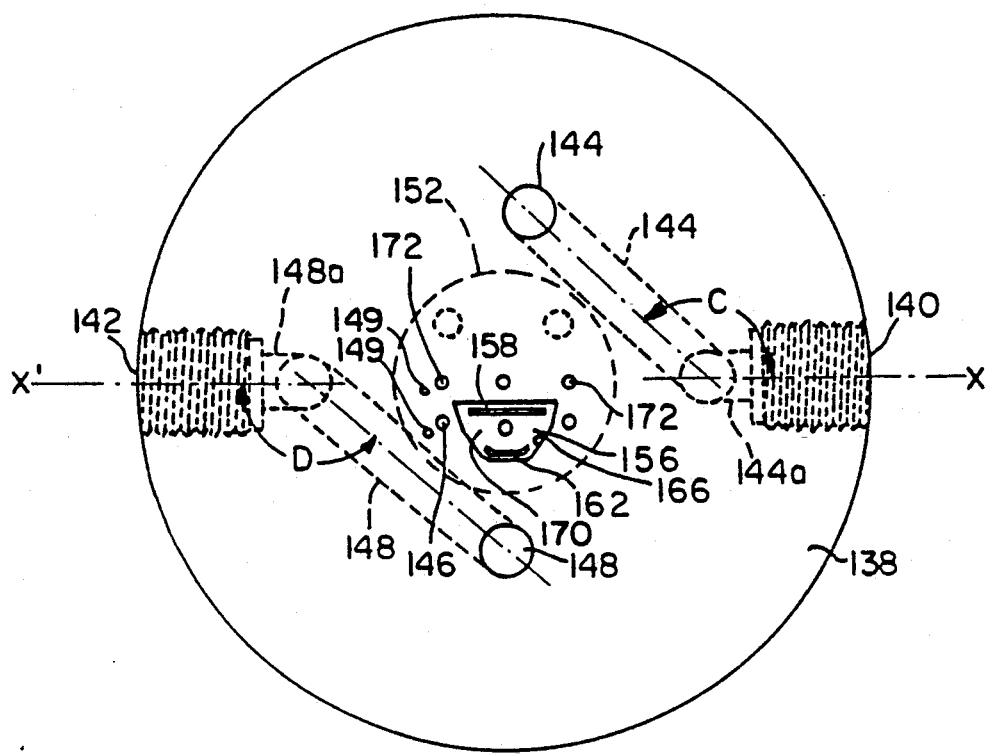

METHOD OF MAKING A SENSING EDGE

This is a division of application Ser. No. 07/881,930 filed May 12, 1992 now U.S. Pat. No. 5,225,640.

FIELD OF THE INVENTION

The present invention relates to a sensing edge for controlling movement of a door and, more particularly, to a sensing edge having a plurality of protective interior cavities in which electrically conductive contacts and connective wiring may be positioned and a method of making the sensing edge.

BACKGROUND OF THE INVENTION

Typical prior art sensing edges generally include a sheath having a cavity along the length thereof wherein at least a portion of a switch is located. The sensing edge is attached to an edge of a door which may be moved in different directions. When external pressure is applied to the sheath of the sensing edge the switch means is activated to actuate a door control device which causes the door to either stop moving or open. For example, external pressure may be applied to the sheath when the sheath contacts an obstructing article, such as a body of a person, located between the sensing edge and an opposed surface. By stopping or changing the direction of movement of the door, damage to the obstructing article may be prevented.

Prior art sensing edges generally have a switch located within a cavity extending along the length of the sheath, the cavity being sealed at both ends. The interior of the cavity typically includes first and second electrically conductive contacts positioned on opposed foam layers within the cavity and spaced apart from each other. When the sensing edge contacts an obstructing article, the portion of the sheath contacting the obstructing article is deflected to cause the first and second contacts to engage and make electrical contact therebetween to actuate the door controlling device.

Such prior art sensing edges are typically time-consuming and difficult to assemble because the foam layers, contacts and electrical wiring must be inserted into and secured within the cavity and the contacts and wiring must be connected. It would be advantageous to have a sensing edge which may be assembled during formation of the sheath and fastening device and wherein the switch (electrical contacts and connective wiring) may be located within the sheath cavity while the sheath and fastening device are formed.

It would also be advantageous to have a plurality of elongated cavities which extend along substantially the entire length of the sheath to increase the structural integrity of the sheath and ensure that the first and second contacts engage upon application of a force to the exterior of the sheath. Such internal cavities would provide channels through which electrical wires and other components may be routed or positioned for attachment to the first and second contacts. The interior cavities would also protect the electrical contacts and wiring from moisture and vapor and prevent dirt and contaminating foreign matter from damaging the electrical contacts and wiring contained therein. The cavities could also be used to house control circuits and/or end of the line resistors.

SUMMARY OF THE INVENTION

Briefly stated, the present invention comprises a sensing edge for controlling movement of a door moving in a first direction by actuation of a device upon force being applied to the sensing edge. The sensing edge comprises a generally rigid elongated base member for being secured to the door and a generally flexible elongated sheath. The sheath comprises a first wall having a first surface and a second surface. The first surface of the first wall is secured to the base member. A first leg and a second leg extend from the second surface of the first wall. A second wall, having a first surface and a second surface, is located generally parallel to and spaced from the first wall to define a first cavity therebetween. The second wall has a first end connected to the first leg and a second end connected to the second leg. A third wall, having a first surface and a second surface, is located generally parallel to and spaced from the second wall to define a second cavity therebetween. The third wall has a first end connected to the first leg and a second end connected to the second leg. A switch means is positioned within the second cavity between the second wall and the third wall. The switch means actuates the device upon application of external pressure to the sheath.

Another aspect of the present invention relates to a method for making the aforementioned sensing edge. In the method, a first material is fed to a die assembly to form a generally rigid elongated base member for being secured to the door. A second material is fed to the die assembly for forming a generally flexible elongated sheath. The sheath comprises a first wall having a first surface and a second surface. The first surface of the first wall is for being secured to the base member. A first leg and a second leg extend from the second surface of the first wall. A second wall, having a first surface and a second surface, is located generally parallel to and spaced from the first wall to define a first cavity therebetween. The second wall has a first end connected to the first leg and a second end connected to the second leg. A third wall, having a first surface and a second surface, is located generally parallel to and spaced from the second wall to define the second cavity therebetween. The third wall has a first end connected to the first leg and a second end connected to the second leg. A first flexible, electrically conductive contact is fed to the die assembly for forming a first elongated contact having a first surface, a second surface, a first end and a second end. The first surface of the first contact is bonded to the second surface of the second wall for securing the first contact to the second wall. A second flexible, electrically conductive contact is fed to the die assembly for forming a second elongated contact having a first surface, a second surface, a first end and a second end. The second surface of the second contact is bonded to the first surface of the third wall opposite the first contact.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings:

FIG. 1 is a front elevational view showing a door construction including a sensing edge in accordance with the present invention;

FIG. 2 is a greatly enlarged cross-sectional view of the sensing edge of FIG. 1 taken along line 2—2 of FIG. 1;

FIG. 7 is a greatly enlarged rear elevational view of the first die plate (exit view) of the die assembly of FIG. 3;

FIG. 10 is a greatly enlarged rear elevational view of the second die plate (exit view) of the die assembly of FIG. 3;

DETAILED DESCRIPTION OF THE PREFERRED EMBODIMENT

Figure 2A:
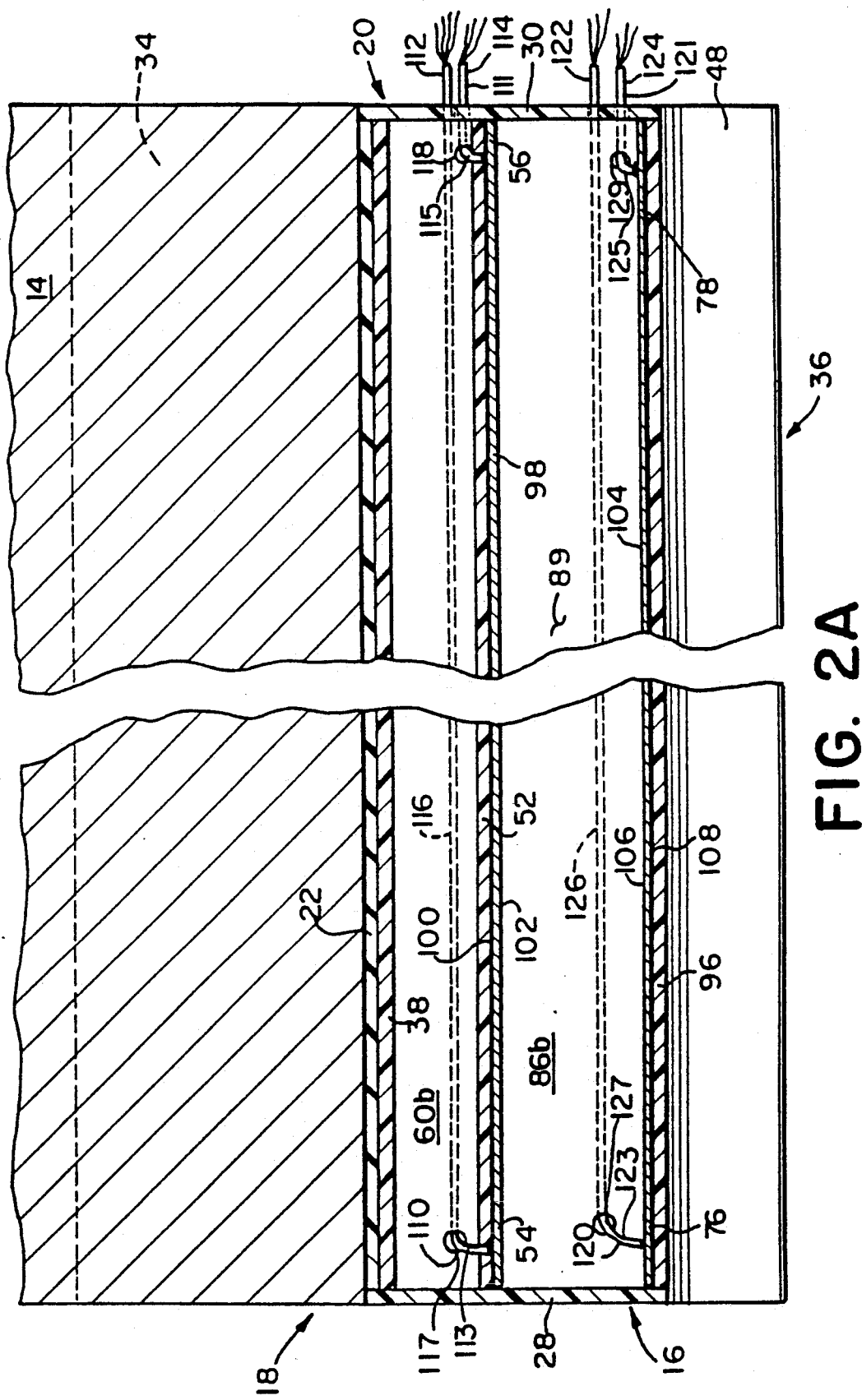
FIG. 2A is a cross-sectional view of the sensing edge of FIG. 2 taken along line 2A—2A of FIG. 2.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the sensing edge and designated parts thereof. The terminology includes the words above specifically mentioned, derivatives thereof and words of similar import.

Referring to the drawings in detail, wherein like numerals indicate like elements throughout, there is shown in FIG. 1 a wall 10 having a doorway 12 provided with a door 14. For purposes of illustration, the door 14 is shown as an overhead door having a sensing edge 16 in accordance with the present invention along its lower side or leading edge 18. However, one of ordinary skill in the art would understand that the sensing edge 16 may be located along any edge of any door structure, such as vertically or horizontally movable doors (not shown), without departing from the spirit and scope of the present invention.

As shown in FIG. 2a, the sensing edge 16 extends substantially along the entire leading edge 18 of the door 14. The sensing edge 16 controls movement of the door 14 by actuating a controlling device (not shown) upon force being applied to the sensing edge 16. As shown in FIG. 1, the door 14 is capable of movement in a generally vertical direction in a plane generally parallel to that of the wall 10. For example, when the door 14 and sensing edge 16 are moving in a generally downward direction, if the sensing edge 16 encounters an obstructing article (not shown) at the leading edge 18, the sensing edge 16 senses the obstructing article and actuates the controlling device to inhibit or change the direction of movement of the door 14, i.e., to a generally upward direction, as described in more detail hereinafter.

Referring now to FIG. 2, the sensing edge 16 comprises a generally rigid elongated base member 20. The base member 20 is designed to clamp onto the leading edge 18 of the door 14, preferably without the need for adhesive or any other type of fasteners, such as screws. The base member 20 includes a mounting plate 22 for being attached to the leading edge is of the door 14. The mounting plate 22 has a first end 24, a second end 26, and includes a first or upper surface and a second or lower surface. The upper and lower surfaces are generally planar and preferably extend generally parallel with respect to each other.

A first elongated clamping member 32 extends from the first end 24 of the mounting plate 22 to form an angle A between the first elongated clamping member 32 and the mounting plate 22. The angle A is preferably less than about 90°, and more preferably about 80° prior to clamping the base member 20 onto the leading edge 18 of the door 14, as shown in phantom in FIG. 2.

A second elongated clamping member 34 extends outwardly from the second end 26 of the mounting plate 22 toward the first clamping member 32 for receiving the leading edge 18 of the door 14 therebetween. The angle B formed between the mounting plate 22 and the second clamping member 34 is preferably less than about 90°, and more preferably about 80° prior to clamping the base member 20 onto the leading edge 18 of the door 14, as shown in phantom in FIG. 2. After the base member 20 is clamped or snapped onto the leading edge 18, the angles A and B are preferably each about 90°, although one of ordinary skill in the art would understand that the angles A and B may be varied, as desired, and are dictated by the external configuration of the leading edge 18 of the door 14.

The first and second clamping members 32, 34 and the mounting plate 22 form a generally trihedrally shaped base member 20 wherein the distance between the distal ends 32a, 34a of the first and second clamping members 32, 34, respectively, is less than the width W of the leading edge 18 of the door 14. It is preferred that the base member 20 be constructed of a polymeric material having sufficient flexibility such that the first and second clamping members 32, 34 can be forced slightly outwardly to receive the leading edge 18 of the door 14. In other words, the first and second clamping members 32, 34 are biased inwardly such that once the leading edge 18 of the door 14 is positioned therebetween, the first and second clamping members 32, 34 exert an inwardly directed force on the door 14 to firmly grip and thereby secure the base member 20 to the door 14, as illustrated in FIG. 2.

One of ordinary skill in the art would understand, however, that the base member 20 may alternatively or additionally be attached to the leading edge 18 of the door 14 by standard fasteners, such as nails, bolts, screws, tacks, or an adhesive or other fastener means without departing from the spirit and scope of the present invention.

Preferably, the base member 20 is constructed of a generally rigid material, such as Santoprene TM 103-50, which is commercially available from Monsanto Co. of St. Louis, Mo., and which is capable of being coextruded with a different material, as discussed in greater detail hereinafter. However, it is understood by those skilled in the art that the base member 20 could be constructed of other materials, such as polyvinyl chloride, neoprene, or other polymeric materials so long as the base member 20 is sufficiently rigid to ensure the structural integrity of the sensing edge 16. It is further preferred that the base member 20 be formed by an extrusion molding process, described in more detail hereinafter. The base member 20 could be formed by other methods, such as die molding or milling, without departing from the spirit and scope of the present invention.

As best shown in FIG. 2, the sensing edge 16 further includes a generally flexible elongated sheath 36, preferably having a generally constant cross-sectional outline configuration. The sheath 36 extends along an axis generally parallel to the leading edge 18 of the door 14. As presently preferred, the sheath 36 has a generally semi-oval cross-section, but one of ordinary skill in the art would understand that any other suitable cross-sectional shape, such as circular, semi-circular, elliptical, rectangular, or square (not shown), may be used in accordance with the present invention.

The sheath 36 includes a generally elongated first wall 38 having a first or upper surface and a second or lower surface. The upper surface of the first wall 38 is secured to the base member 20. More specifically, the upper surface of the first wall 38 is secured to the lower surface of the mounting plate 22 of the base member 20.

Preferably, the sheath 36 is coextruded with the base member 20 such that the upper surface of the first wall 38 is bonded to the lower surface of the mounting plate 22 of the base member 20. Therefore, it is preferred that the base member 20 and the sheath 36 be formed from chemically compatible materials which, upon the application of heat and pressure during the coextrusion process, form chemical bonds to securely attach the sheath 36 to the base member 20. It is preferred that the sheath 36 be formed from a polymeric material, and, more preferably, from Santoprene TM 101-55, which is commercially available from Monsanto Co.

As best shown in FIG. 2, a first leg 44 and a second leg 46 extend downwardly from the lower surface of the first wall 38. Preferably, the distal ends of both the first leg 44 and the second leg 46 are generally arcuate in cross section and the proximate ends thereof extend generally perpendicularly from the second surface 42 of the first wall 38. Each of the first leg and second leg 44, 46 preferably include flexible members 48 which form the distal ends thereof. The flexible members 48 gradually decrease in thickness from the first end adjacent to the second surface 42 of the first wall 38 to the opposite, second end. However, the flexible members could alternatively increase in thickness from the first end to the second end or could be uniform in thickness.

The flexible members 48 are preferably constructed to be flexible enough to permit the sensing edge 16 to detect an obstructing article but stiff enough to abut and seal an adjacent surface (not shown) when the door 14 is in a closed position without actuating the sensing edge 16. That is, when the door 14 is in a closed position, the flexible members 48 are inclined toward one another as illustrated in FIG. 2 and form a seal between the sensing edge 16 and the adjacent surface (not shown). The seal prevents air currents from entering or exiting through the gap created between the leading edge 18 of the door 14 and the adjacent surface.

Three grooves 50 are preferably positioned on an inner surface of the first leg 44 and an inner surface of the second leg 46 for increasing the flexibility of the first leg 44 and second leg 46. One of ordinary skill in the art would understand, however, that the grooves 50 may be omitted or positioned on the outer surfaces of the flexible members 48. Moreover, the present invention is not limited to any particular number of grooves 50 in the flexible members 48. The grooves 50 are preferably U-shaped in cross section, but may be formed in any shape, such as V-shaped or any other suitable shape as desired.

The sheath 36 includes a generally elongated second wall 52 having a first or upper surface and a second or lower surface. The second wall 52 is located generally parallel to and spaced from the first wall 38 to define a first cavity 58 therebetween. The second wall 52 has a first end 70 connected to the first leg 44 and a second end 72 connected to the second leg 46. It is preferred that the first and second walls 38, 52 be generally planar, although either or both of the first and second walls 38, 52 may be generally arcuate or include corrugations, for example.

The sheath 36 preferably includes a pair of spaced first cavity reinforcing walls 60a, 60b positioned within the first cavity 58. Each first cavity reinforcing wall 60a, 60b has a first edge 62 and a second edge 64. The first edge 62 is secured to the lower surface of the first wall 38. The second edge 64 is secured to the upper surface of the second wall 52.

More particularly, the pair of first cavity reinforcing walls 60a, 60b extends between the first wall 38 and the second wall 52 to define the first cavity 58 therebetween. The pair of first cavity reinforcing walls 60a, 60b also define a first outer cavity 66 between the left first cavity reinforcing wall 60b and the first leg 44 and a second outer cavity 68 between the right first cavity reinforcing wall 60a and the second leg 46. It is understood by those skilled in the art that the present invention is not limited to a particular number of reinforcing walls and that one, three or more could be used without departing from the spirit and scope of the invention.

As best shown in FIG. 2, it is preferred that the first cavity reinforcing walls 60a, 60b be angled outwardly with respect to a vertical center line (not shown) of the sheath 36. More specifically, it is preferred that the first cavity reinforcing walls 60a, 60b be oriented at an obtuse angle E with respect to the second wall 52. Generally the angle E is greater than 90° and less than 180°, and preferably about 125°. The second edge 64 of each of the first cavity reinforcing walls 60a, 60b is preferably secured to the second wall 52 in the general vicinity of the switch to enhance the structural integrity of the sheath 36 and facilitate alignment of the switch when an external force contacts the outer surface of the sheath 36, as described in more detail hereinafter.

The sheath 36 includes a third wall 74 having an upper surface and a lower surface. The third wall 74 is located generally parallel to (at least in part) and spaced from the second wall 52 to define a second cavity 80 therebetween. The third wall 74 has a first end 82 connected to the first leg 44 and a second end 84 connected to the second leg 46.

Preferably, the sheath 36 includes a pair of spaced second cavity reinforcing walls 86a, 86b positioned within the second cavity 80. The second cavity reinforcing walls 86a, 86b have a first edge 88 and a second edge 90. The first edge 88 of the second cavity reinforcing walls 86a, 86b is secured to the lower surface of the second wall 52. The second edge 90 of the second cavity reinforcing walls 86a, 86b is secured to the upper surface of the third wall 74.

More particularly, the pair of second cavity reinforcing walls 86a, 86b extends between the second wall 52 and the third wall 74 to define a second cavity 80 therebetween. The pair of second cavity reinforcing walls 86a, 86b also define a third outer cavity 92 between the left second cavity reinforcing wall 86b and the first leg 44 and a fourth outer cavity 94 between the right second reinforcing wall 86a and the second leg 46. It is understood by those skilled in the art that the present invention is not limited to a particular number of reinforcing walls and that one, three or more could be used without departing from the spirit and scope of the invention.

As best shown in FIG. 2, it is preferred that the second cavity reinforcing walls 86a, 86b be angled outwardly with respect to the vertical center line (not shown) of the sheath 36. It is further preferred that the second cavity reinforcing walls 86a, 86b form an obtuse angle F greater than about 90° and less than about 180°, and more preferably about 115°, with the third wall 74. The second edge 90 of each of the second cavity reinforcing walls 86a, 86b is preferably secured to the third wall 74 in the general vicinity of the switch. The angle and position of the second cavity reinforcing walls 86a, 86b enhances the structural integrity of the cavities 80, 92, 94.

The second cavity reinforcing walls 86a, 86b are preferably generally arcuate in cross section, although the shape of the same may be varied as desired. At least one groove 87 is positioned on an inner surface 89 of at least one of the second cavity reinforcing walls 86a, 86b for increasing the flexibility of the same. However, one of ordinary skill in the art would understand that the grooves 87 may be omitted or positioned on the outer surfaces of the second cavity reinforcing walls 86a, 86b. As shown in FIG. 2, only a single U-shaped in cross section groove 87 is positioned on the inner surface 89 of each of the second cavity reinforcing walls 86a, 86b, although the number and shape of the grooves 87 may be varied, as desired. The number and shape of the grooves are selected in accordance with the desired sensitivity of the sensing edge. It is preferred that the sensing edge 16 be responsive to not greater than fifteen pounds of force applied transversely to the sensing edge 16 by a tube having a $1\frac{7}{8}''$ diameter.

The third wall 74 is preferably generally arcuate in shape, as best shown in FIG. 2, and includes a generally flattened central portion 96. One of ordinary skill in the art would understand that any of the first, second, and third walls 38, 52, 74 and first and second cavity retaining walls 60a, 60b, 86a, 86b may have any shape, such as arcuate or flat, as desired, in accordance with the spirit and scope of the present invention.

As best shown in FIG. 2a, it is preferred that end walls 28, 30 close and seal each end of the sheath 36 to thereby form an enclosed area for receiving at least a portion of a switch (described hereinafter) for actuating the controlling device (not shown) upon application of external pressure to the sheath 36. Alternatively, an end plug (not shown) could be used instead of an end wall to seal each end of the sheath 36, as is understood by those of ordinary skill in the art.

As best shown in FIG. 2, a switch means is positioned within the second cavity 80 between the second wall 52 and the third wall 74 for actuation of the device for inhibiting or changing the direction of movement of a door 14 upon application of external pressure to the sheath 36 mounted thereon. One of ordinary skill in the art would understand that the switch means could cause other actions, such as causing a closing door 14 to open.

In the present embodiment, it is preferred that the switch means be comprised of a first flexible, electrically conductive contact 98 having a first or upper surface 100 and a second or lower surface 102. As best shown in FIG. 2a, the first contact 98 includes a first end 54 and a second end 56. Referring now to FIG. 2, the first contact 98 is positioned within the second cavity 80 between the second and third walls 52, 74 with the upper surface 100 of the first contact 98 in facing engagement with the lower surface of the second wall 52.

The switch means preferably further includes a second flexible, electrically conductive contact 104 having a first or upper surface 106 and a second or lower surface 108. As shown in FIG. 2a, the second contact 104 includes a first end 76 and a second end 78. The second contact 104 is positioned between the second wall 52 and the third wall 74, with the lower surface 108 of the second contact 104 in facing engagement with the upper surface of the third wall 74 in the vicinity of the flattened central portion 96 thereof. Upon application of external pressure to the sheath 36, a portion of the upper surface 106 of the second contact 104 deflects into the second cavity 80 towards the first contact 98 and engages and makes electrical contact therewith to thereby actuate the device.

The first contact 98 and second contact 104 are preferably formed from a multilayered material. More specifically, it is preferred that the first and second contacts 98, 104 have a first layer (not shown) constructed of a thermoplastic material, such as polyethylene or polypropylene, which is compatible with the sheath material to form a bond upon the application of heat and pressure as the sheath 36 is coextruded through a die. The first layer engages a portion 96 of the upper surface of the third wall 74 and is preferably bonded thereto. The other side of the first layer engages a layer of insulating material (not shown), such as fiberglass cloth. The insulating material preferably provides insulative properties to the first and second contacts 98, 104, as well as enhanced structural integrity. A third layer (not shown) of a flexible insulative material, such as the polyester film Mylar ™, and a fourth layer (not shown) of an electrically conductive material, such as aluminum, aluminum foil, or copper, are layered upon the insulating material, successively, opposite the first layer to form a four layer electrical contact. The fourth layer provides the electrical contact when the first contact 98 and second contact 104 are engaged when external pressure is applied to the sheath.

One of ordinary skill in the art would understand that other typical prior art contacts, such as a strip of metallic foil or a multilayered woven tape, may be used for the first and second contacts 98, 104, in keeping with the spirit and scope of the present invention.

As best shown in FIG. 2a, the switch means may further comprise electrical conductors or a first generally elongated wire 110 and a second generally elongated wire 111. The first wire 110 has a first end 112 and a second end 113. The second wire 111 also has a first end 114 and a second end 115. The first wire 110 has a portion 116 (shown in phantom) positioned within the first outer cavity 66. Preferably, the portion 116 of the first wire 110 is positioned within substantially the entire length of the first outer cavity 66, as shown in phantom in FIG. 2a.

The second end 113 of the first wire 110 is positioned through an aperture 117 in at least one of the second wall 52 and the left first cavity reinforcing wall 60b which defines the first outer cavity 66. The second end 113 of the first wire 110 is electrically connected to the first end of the first contact 98.

The second end 115 of the second wire 111 is preferably positioned through another aperture 118 in at least one of the second wall 52 and the left first cavity reinforcing wall 60b which defines the first outer cavity 66. Alternatively, the second end 115 of the second wire 111 may be positioned through an aperture (not shown) in the end wall 30. The second end 115 of the second wire 111 is electrically connected to the second end of the first contact 98.

Preferably the electrical connections are soldered, although any other conventional means for connecting the electrical wires and contacts may be used. One of ordinary skill in the art would understand that the second end 115 of the second wire 111 may alternatively be positioned within the first outer cavity 66 and through aperture 117 and electrically connected to the first end of the first contact 98, with the second end 113 of the first wire 110 being electrically connected to the second end of the first contact 98.

The first ends 112, 114 of each of the first and second wires 110, 111 are preferably positioned through apertures (not shown) in end wall 30 and electrically connected to the control device (not shown). Further discussion of the electrical connections to and details of the control device have been omitted since such connections and devices are within the understanding of an ordinarily skilled artisan.

The switch means may further comprise a generally elongated third wire 120 and a generally elongated fourth wire 121. The third wire 120 has a first end 122 and a second end 123. The fourth wire 121 also has a first end 124 and a second end 125. The third wire 120 has a portion 126 (shown in phantom) positioned within the third outer cavity 92. Preferably, the portion 126 of the third wire 120 is positioned within substantially the entire length of the third outer cavity 92, as shown in phantom in FIG. 2a.

The second end 123 of the third wire 120 is positioned through an aperture 127 in the left second cavity reinforcing wall 86b which defines the third outer cavity 92. The second end 123 of the third wire 120 is electrically connected to the first end of the second contact 104.

The second end 125 of the fourth wire 121 is preferably positioned through another aperture 129 in the left second cavity reinforcing wall 86b or through an aperture (not shown) in end wall 30. The second end 125 of the fourth wire 121 is electrically connected to the second end of the second contact 104. One of ordinary skill in the art would understand that the second end 125 of the fourth wire 121 may alternatively be positioned within the third outer cavity 92 and through aperture 127 and electrically connected to the first end of the second contact 104, with the second end 123 of the third wire 120 being electrically connected to the second end of the second contact 104. The first ends 122, 124 of each of the third and fourth wires 120, 121 are preferably positioned through apertures (not shown) in end wall 30 and electrically connected to the control device (not shown).

One of ordinary skill in the art would understand that more than one wire may be positioned within any of the cavities, as desired. It is also understood by those skilled in the art that the present invention is not limited to positioning the first and third wires 110, 120 in any particular cavity.

The electrical conductors or wires are used in connection with a circuit (not shown) for controlling the actuation of the device, as is understood by those skilled in the art, in response to the application of external pressure to the sheath 36, as described above. In the present embodiment, the area of the second cavity 80 between the first and second contacts 98, 104 allows the third wall 74 to be readily deflectable towards the second wall 52. The second and third walls 52, 74 are preferably constructed from the sheath material such that the second and third walls 52, 74 have sufficient memory to assume the position shown in FIG. 2 when a force applied to the sensing edge 16 is released.

In operation, the sensing edge 16 contacts an object (e.g., a human being) in the path of the closing door 14. The third wall 74 deflects toward the second wall 52 such that the first and second contacts 98, 104 contact each other and actuate the device. Since there is a slight delay before the device is actuated (due to the inherent delay characteristics of all control circuitry), the third wall 74 continues to deflect towards the adjacent surface, causing the flexible second wall 52 to also deflect until the device is actuated. Thus, the third wall 74 is spaced from the base reember 20 a sufficient distance to accommodate the continued deflection without the third wall 74 touching the base member 20. This continued deflection is commonly referred to as overtravel. Consequently, objects sensed by the present invention are not damaged due to overtravel.

A preferred method according to the present invention of extrusion molding a sensing edge 16 of a first and second material and having switch means positioned therein will now be described generally. One of ordinary skill in the art would understand, however, that the sensing device 16 may be made by a variety of different methods, such as injection molding, etc.

Figure 3:
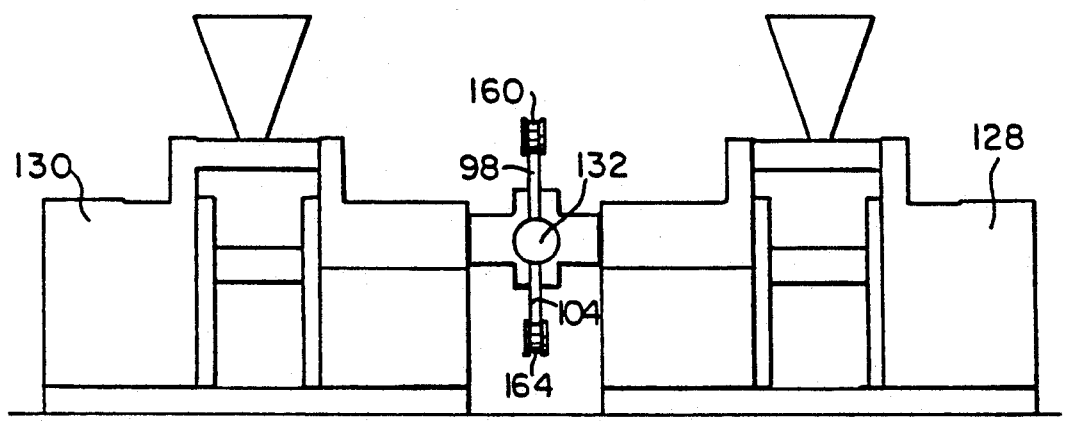
FIG. 3 is a front elevational view of first and second extruders through which first and second materials are fed to a die assembly for coextrusion of the sensing edge.

Referring now to FIG. 3, there is shown a first extruder 128 and a second extruder 130 for providing the first material and the second material, respectively, for coextrusion through a die assembly 132. The first material is used to form the base member 20 and the second material is used to form the sheath 36, as discussed in detail above. Preferably, the extruders are single screw extruders, which are commercially available from Davis-Standard, a division of Crompton and Knowles of Pawcatuck, Conn. However, one of ordinary skill in the art would understand that a variety of extruders, such as a twin screw extruder may be used in the present method. Such extruders are well known to those of ordinary skill in the art and further discussion thereof is omitted for purposes of convenience only and is not limiting.

Figure 4:
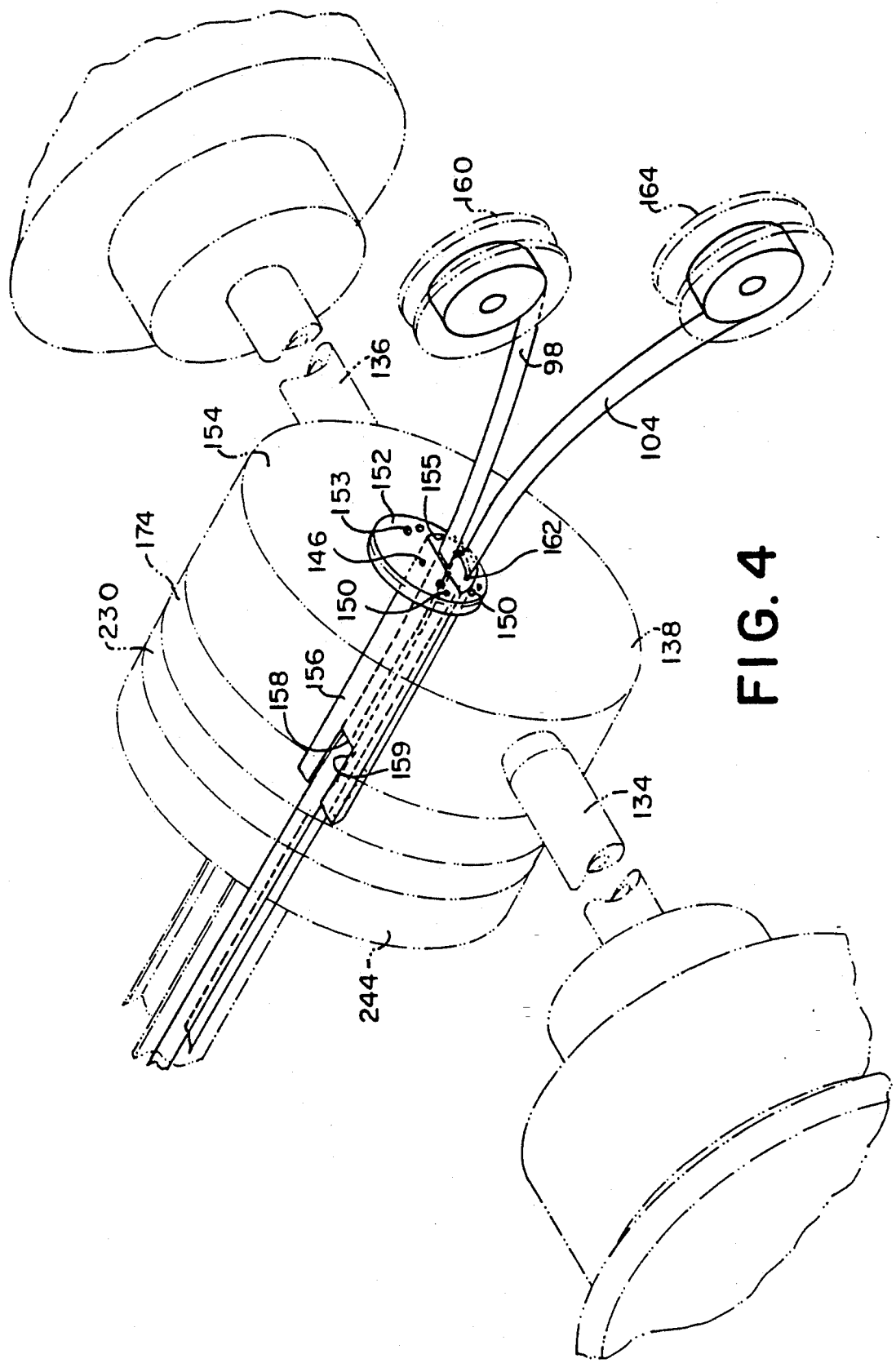
FIG. 4 is a partial perspective view of the die assembly, portions of the first and second extruders, and electrical contact supply reels.
Figure 5A:
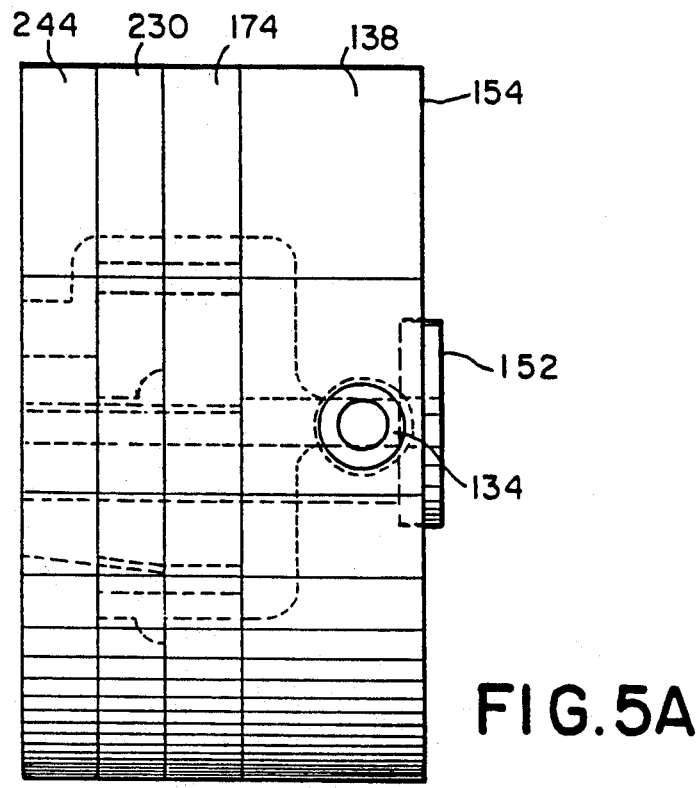
FIG. 5A is a left side elevational view of the die assembly.

The die assembly 132, which as presently preferred consists of a series of four die plates, is shown in FIGS. 4-14 and, more particularly, in FIG. 5A. The individual die plates of the die assembly 132 are aligned and maintained in facing engagement by a plurality of screws (not shown) extending through apertures (not shown) in each die plate, as is well understood by those skilled in the art. Each aperture is preferably perpendicular to the respective faces of each die plate. For purposes of clarity in the drawings, the screws and corresponding apertures have been omitted in the drawings. One of ordinary skill in the art would understand that other conventional fastening means may alternatively or additionally be used to form the die assembly 132 from the plurality of individual die plates. FIG. 4 is a perspective view of the die assembly 132, including the adaptors 134, 136, (shown in phantom) which convey the first and second materials, respectively, from the first and second extruders 128, 130 to the die assembly 132. The die assembly 132 is preferably maintained at a temperature of 360° F. by a heater band (not shown) during the extrusion process, although other temperatures could be used without departing from the spirit and scope of the invention.

Figure 6:
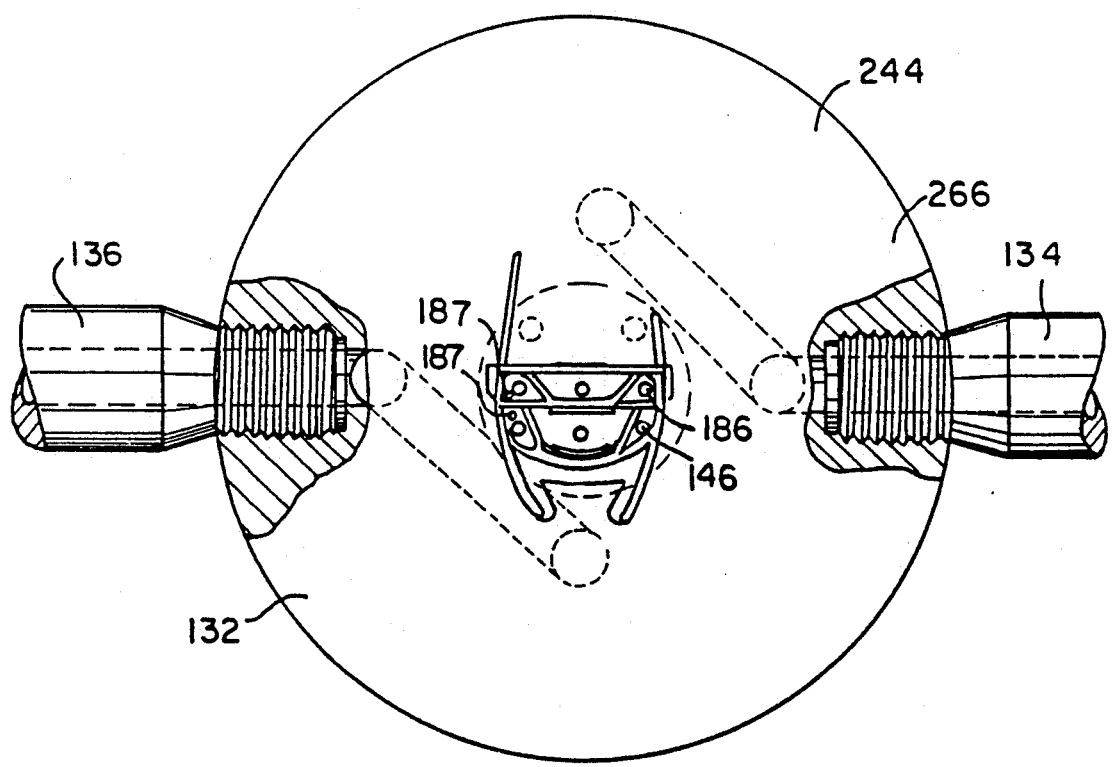
FIG. 6 is a greatly enlarged rear elevational view of the die assembly (exit view) of FIG. 3.

FIG. 6 is an exit view of the die assembly 132 which more clearly shows the adaptors 134, 136 positioned within the die assembly 132. More specifically, FIG. 7 is an exit view of a first die plate 138 of the present invention including a first threaded bore 140 for receiving the first adaptor 134 and a second threaded bore 142 for threadably receiving the second adaptor 136. In the present method, the first material is fed to the first die plate 138 of the die assembly 132 from the first extruder 128 through the first adaptor 134 which is positioned within the first threaded bore 140. While, as presently preferred, the adaptors 134, 136 each have external threads for being received in threaded bores 140, 142, respectively, an ordinarily skilled artisan would understand that the adaptors 134, 136 may be retained in position within the bores 140, 142 by clamps, etc.

The first material flows from the first adaptor 134 through a first conduit 144 (shown in phantom in FIG. 7) and thereby through the first die plate 138. The second material is fed to the first die plate 138 from the second extruder 130 through the second adaptor 136 which is positioned within the second threaded bore 142. The second material flows from the second adaptor 136 through a second conduit 148 (shown in phantom in FIG. 7), and thereby through the first die plate 138.

As shown in FIG. 7, the first and second conduits 144, 148 are generally circular in cross section. The first conduit 144 extends generally upwardly from and at an angle C to a central horizontal axis X of the first threaded bore 140. Preferably, the angle C is about 135°, however, the angle C may be varied based upon such factors as the orientation of the first threaded bore 140 with respect to a horizontal axis (not shown) which bisects the first die plate 138. The second conduit 148 extends generally downwardly from and at angle D to a central axis X' of the second threaded bore 142. Preferably the angle D is also about 135°, however the angle D may vary based upon such factors as the orientation of the second threaded bore 140 with respect to the horizontal axis of the first die plate 138.

Figure 5:
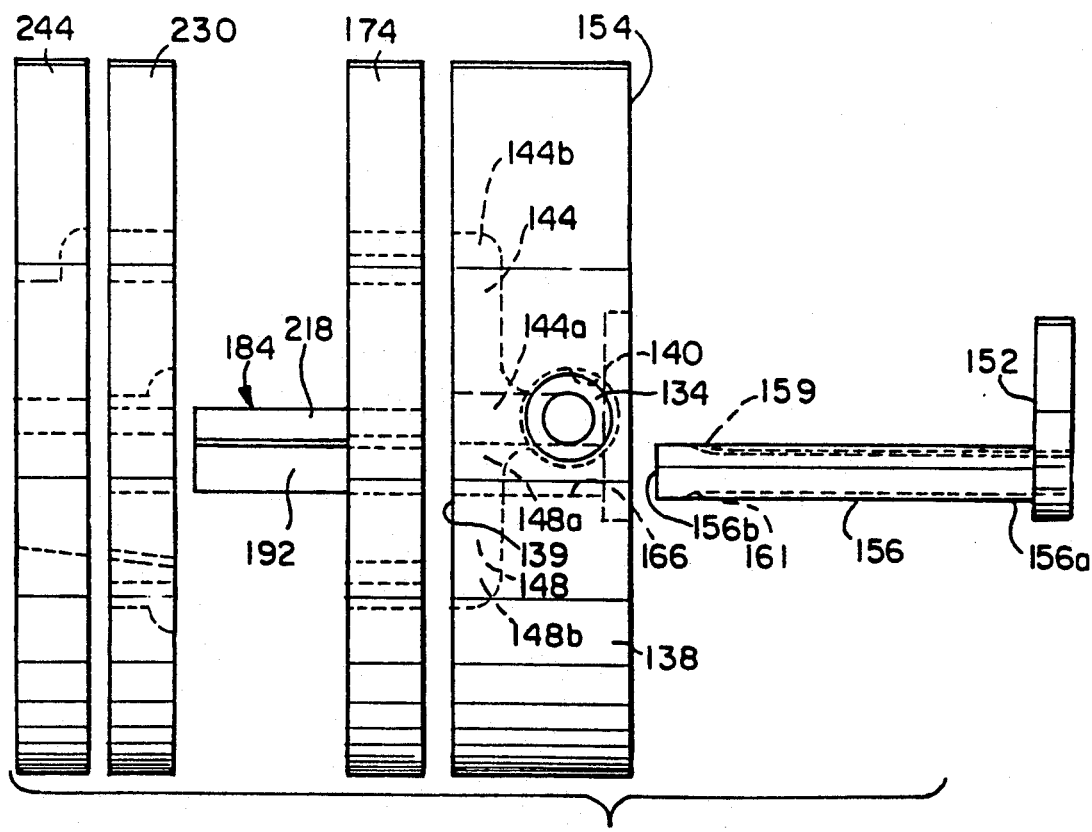
FIG. 5 is an exploded left side elevational view of the die assembly.

As shown in FIG. 5, a first portion 144a of the first conduit 144 extends generally horizontally from the first threaded bore 140 and angles generally upwardly therefrom to a second portion 144b, which is generally perpendicular to the exit face 139 of the first die plate 138. The portion 145 of the first conduit 144 extends through the first die plate 138 to permit the first material to pass therethrough. Likewise, a first portion 148a of the second conduit 148 extends generally horizontally from the second threaded bore 142 and angles generally downwardly therefrom to a portion 148b, which is generally perpendicular to the exit face 139 of the first die plate 138. The second conduit 148 extends through the first die plate 138 to permit the second material to pass therethrough. One of ordinary skill in the art would understand that the first and second conduits 144, 148 may have different configurations as desired so long as the first conduit 144 provides a passageway for the first material to flow between the first bore 140 and the exit face 139 of the first die plate 138 and so long as the second conduit 148 provides a passageway for the second material to flow between the second bore 142 and exit face 139 of the first die plate 138.

As shown in FIG. 4, a mandrel plate 152 (shown in phantom in FIG. 7) is located in the entrance face 154 of the first die plate 138. The mandrel plate 152 has an opening 155 for receiving an insert 156 through which the first and second electrical contacts 98, 104 are fed. The mandrel plate 152 also includes at least one, and preferably a plurality of, apertures 153 extending therethrough in which supporting pins 146 are receivably accommodated. The shape of each of the apertures 153 generally corresponds to the shape of the supporting pin 146 received therein. The first die plate 138 also includes apertures 172 extending therethrough correspondingly generally to the apertures 153 in the mandrel plate 152 and in which supporting pins 146 are receivably accommodated. Preferably, each of the supporting pins 146 has generally elongated cylindrical shape, the length of the supporting pins 146 being sufficient to extend fully through the die assembly 132.

In an alternate embodiment, the mandrel plate 152 includes at least one, and preferably a plurality of apertures 150 through which electrical wires, such as the first wire 110 and third wire 120, may be fed during the extrusion process, as described in more detail hereinafter. The wires may be supplied by a conventional supply means such as a rotatably mounted reel (not shown) well known to those of ordinary skill in the art.

Referring now to FIG. 5, the first contact 98 is supplied to a first bore 158 in the insert 156 from a first supply reel 160. The second contact 104 is supplied to a second bore 162 in the insert 156 from a second supply reel 164. One of ordinary skill in the art would understand that the first and second contacts 98, 104 may be supplied to the insert 156 by a supply means other than reels.

Figure 8:
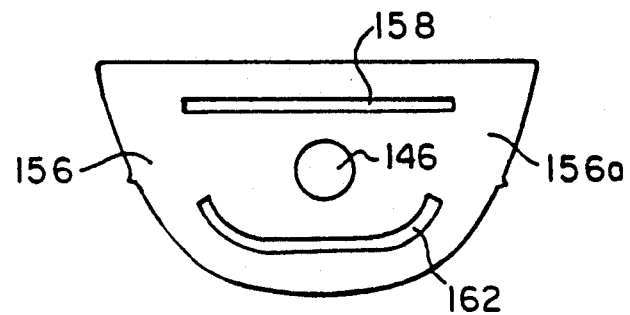
FIG. 8 is a greatly enlarged front elevational view of an insert (entrance view) of the die assembly of FIG. 3.

Referring now to FIG. 7, the insert 156 extends through the opening 155 in mandrel plate 152 and successively through each of the die plates of the die assembly 132. The insert 156 is receivably accommodated within a third aperture 166 in the first die plate 138. As shown in FIG. 8, it is preferred that the first bore 158 of the insert 156 be generally rectangular in cross section and that the second bore 162 be generally arcuate in cross section, however, the shape in cross section of the first and second bores 158, 162 may be varied as desired. The second bore 162 is preferably generally arcuate in cross section to shape the second contact 104 to conform to the shape of the third wall 74 of the sheath 36.

Figure 9:
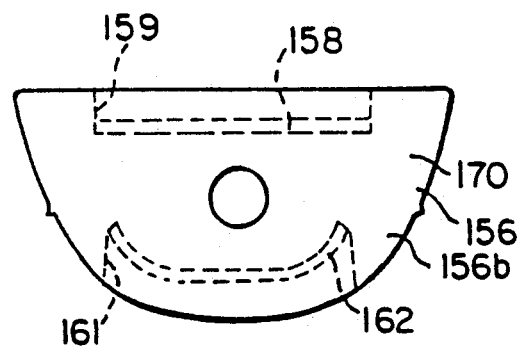
FIG. 9 is a greatly enlarged rear elevational view of the insert (exit view) of FIG. 8.

As best shown in FIGS. 8 and 9, preferably, the first and second bores 158, 162 are angled along a longitudinal axis of the insert 156 such that the first and second bores 158, 162 extend away from each other as they approach the opposite end 170 of the insert 156. Angling the first and second bores 158, 162 away from each other facilitates feeding of the first and second contacts 98, 104 into the insert 156 and prevents jamming of the contacts 98, 104 entering the insert 156.

The first and second bores 158, 162 emerge at the upper and lower periphery, respectively, of the insert 156 short of the second end 170. That is, proximate the upper and lower peripheries of the second end 170 of the insert 156, there is provided a pair of notches 159, 161 best shown in FIGS. 4 and 9. Preferably, the first and second bores 158, 162 emerge at the base of the notch 159. The notches 159, 161 are angled upwardly and become generally flush with the second end 170 of the insert 156 to force the contacts 98, 104 upwardly and downwardly, respectively, to facilitate bonding between the first contact 98 and the second wall 52 and the second contact 104 and the third wall 74.

In an alternate preferred embodiment, the first die plate 138 may further include at least two apertures 149 (shown in FIG. 7) extending therethrough for receivably accommodating the electrical connectors or wires, such as the first wire 110 and third wire 120, received from the apertures 150 of the mandrel plate 152. One of ordinary skill in the art would understand that the first die plate 138 may have less or more than two apertures 149, as desired, although preferably each wire has a separate corresponding aperture 149.

After emerging from the first aperture 146 of the first die plate 138, the first material passes through the first aperture 176 in the second die plate 174, as shown in FIG. 10. The first aperture 176 of the second die plate 174 is aligned with the first aperture 146 of the first die plate 138 and preferably is of the same size, shape and cross section, i.e., circular, as the first aperture 146 of the first die plate 138. The first aperture 176 of the second die plate 174 is preferably generally cylindrical and extends through the second die plate 174 along a longitudinal axis (not shown) generally perpendicular thereto.

Likewise, after emerging from the second conduit 148 of the first die plate 138, the second material passes through the second aperture 180 in the second die plate 174. The second aperture 180 of the second die plate 174 is aligned with the second conduit 148 of the first die plate 138 and is preferably of the same cross-sectional dimensions. The second aperture 180 of the second die plate 174 is also preferably cylindrical and has a longitudinal axis (not shown) which is generally parallel to the longitudinal axis of the first aperture 176.

As shown in FIG. 10, the second die plate 174 also includes a third aperture 182 extending longitudinally therethrough in a direction generally perpendicular to the exit surface 178 of the second die plate 174. The shape of the third aperture 182 generally corresponds to and is sized to accommodate therein the insert 156.

As shown in FIGS. 4 and 5, the second die plate 174 also includes a plurality of mandrels, indicated generally at 184, for defining the first and second cavity reinforcing walls 60, 86 during the coextrusion process. As shown in FIG. 5, the mandrels 184 extend from the exit surface 178 of the second die plate 174 and are generally parallel to and spaced from the third aperture 182. Each of the mandrels 184 extends from the second die plate 174 a sufficient length so as to extend through the third and fourth die plates 230, 244.

Each of the mandrels 184 includes an aperture 186, best shown in FIG. 10, extending through the second die plate 174 and through each mandrel 184 for accommodating the supporting pins 146. Each of the apertures 186 is aligned with and generally corresponds in cross-sectional dimension to the supporting pins 146.

In the alternative embodiment, at least one, and preferably a plurality of the mandrels 184 includes apertures 187, as shown in FIG. 10, extending through the second die plate 174 and through each mandrel 184 for accommodating the electrical wires, received from the apertures 149 of the first die plate 138, therethrough. Each of the apertures 187 is aligned with and generally corresponds in cross-sectional dimension to the corresponding apertures 149 of the first die plate 138. For purposes of clarity in the drawings, apertures 187 are shown in the first and fourth mandrels 188, 206, although one of ordinary skill in the art would understand that apertures 187 may be included in any or none of the mandrels 184, as desired.

As shown in FIG. 10, a first mandrel 188 having a generally crescent shape and a truncated upper portion extends from the second die plate 174. A first gap 190 located between the mandrel 188 and the insert 156 defines the left second cavity reinforcing wall 86b during the coextrusion process. On the opposite side of the insert 156 is located a second mandrel 192 which extends from the exit surface 178 of the second die plate 174. The second mandrel 192 is also generally crescent-shaped and has a truncated upper portion.

The second mandrel 192 is the mirror image of the first mandrel 188 across a vertical center line (not shown) which bisects the second side plate 174. A second gap 194 located between the second mandrel 192 and the insert 156 opposite the first gap 190 defines the right second cavity reinforcing wall 86a. The shapes of the mandrels 188, 192 and insert 156 and the distance of the first and second gaps 190, 194 therebetween will determine the shape and thickness of each of the second cavity reinforcing walls 86a, 86b.

Referring to FIG. 10, a third mandrel 196 extends from the exit surface 178 of the second die plate 174 and is generally parallel to the first and second mandrels 188, 192 and the insert 156. The third mandrel 196 has a first, generally flat surface 198 and a second generally arcuate surface 200 having a flattened portion 202 proximate the middle of the arc. Generally, the third mandrel 196 has a half-moon shape in cross section. A third gap 204 is located between the arcuate surface 200 of the third mandrel 196 and the insert 156 to define a portion 205 (shown in FIG. 2) of the second wall 52.

Referring to FIG. 10, a fourth mandrel 206 extends from the exit surface 178 of the second die plate 174 and is generally parallel to the first, second and third mandrels 188, 192, 196 and the insert 156. The fourth mandrel 206 has a generally flat first surface 208 and a generally arcuate second surface 210 which corresponds in part to the second surface 200 of the third mandrel 196. A fourth gap 212 is located between the arcuate second surface 210 of the fourth mandrel 206 and the second surface 200 of the third mandrel 196 to define the left first cavity reinforcing wall 60b. A fifth gap 214 is located between the first surface 208 of the fourth mandrel 206 and the first mandrel 188 and insert 156 to define a second portion 216 (shown in FIG. 2) of the second wall 52.

As shown in FIG. 10, a fifth mandrel 218 extends from the exit surface 178 of the second die plate 174 and is generally parallel to the first, second, third and fourth mandrels, 188, 192, 196, 206 and the insert 156. The fifth mandrel 218 is similarly shaped but a mirror image of the fourth mandrel 206 across the vertical center line (not shown) which bisects the second die plate 174. A sixth gap 220 is located between a first surface 222 of the fifth mandrel 218 and insert 156 to define the right first cavity reinforcing wall 60a. A seventh gap 224 is located between a second surface 226 of the fifth mandrel 218 and the second mandrel 192 and insert 156 to define a third portion 228 (shown in FIG. 2) of the second wall 52.

One of ordinary skill in the art would understand that the thickness and configuration of the second wall 52 and first and second cavity reinforcing walls 60, 86 is influenced by such factors as the shape of each of the mandrels 184 and the configuration of each of the gaps.

Figure 11:
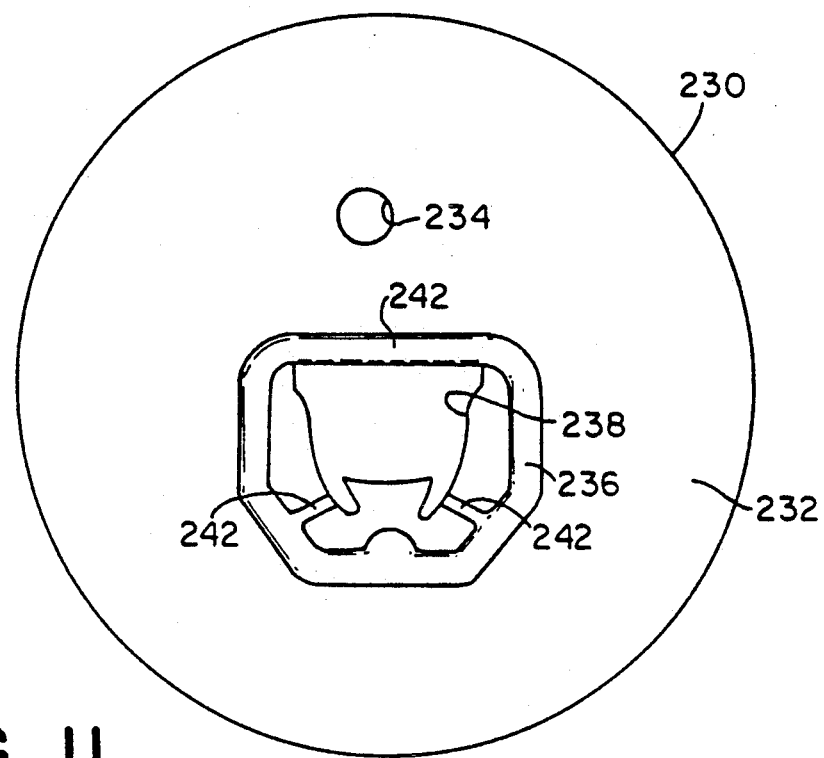
FIG. 11 is a greatly enlarged front elevational view of the third die plate (entrance view) of the die assembly of FIG. 3.

Referring now to FIG. 11, there is shown the entrance surface 232 of the third die plate 230. After emerging from the first aperture 176 of the second die plate 174, the first material passes through the first aperture 234 which extends through the third die plate 230. The first aperture 234 of the third die plate 230 is aligned with and has preferably the same configuration in cross section as the first aperture 176 of the second die plate 174.

After emerging from the second aperture 180 of the second die plate 174, the second material flows to substantially fill a cavity or groove 236 in the entrance surface 232 of the third die plate 230. A bore 238 extends longitudinally through the third die plate 174, to emerge from the exit surface 240 of the third die plate 174 (shown in FIG. 12). As best shown in FIG. 11, the groove 236 is spaced from and surrounds the bore 238. Channels 242 extend between the groove 236 and the bore 238 through which the second material is directed to facilitate even filling of the bore 238. The bore 238 of the groove 236 receivably accommodates the insert 156 and mandrels 184, as best shown in FIGS. 4 and 5.

Figure 12:
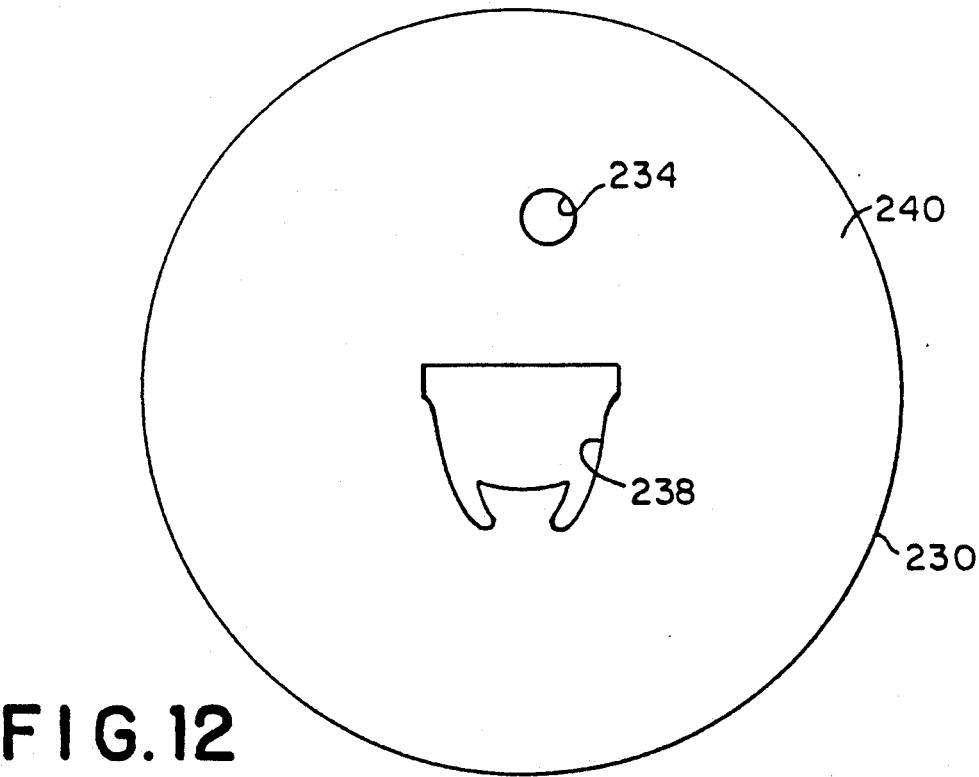
FIG. 12 is a greatly enlarged rear elevational view of the third die plate (exit view) of the die assembly of FIG. 3.

Referring now to FIG. 12, the bore 238 is shaped so as to generally define the first wall 38, first and second legs 44, 46 and the generally flattened portion 96 of the third wall 74. The second material flows through the bore 238 of the groove 236 and fills the first, second, third, fourth, fifth, sixth, and seventh gaps 190, 194, 204, 212, 214, 220, 224, respectively, between the insert 156 and mandrels 184 to form the first and second cavity reinforcing walls 60, 86 and the second wall 52. The second material also flows between the mandrels 184 and bore 238 to generally define the first wall 38, first and second legs 44, 46, flexible members 48 an third wall 74.

Figure 13:
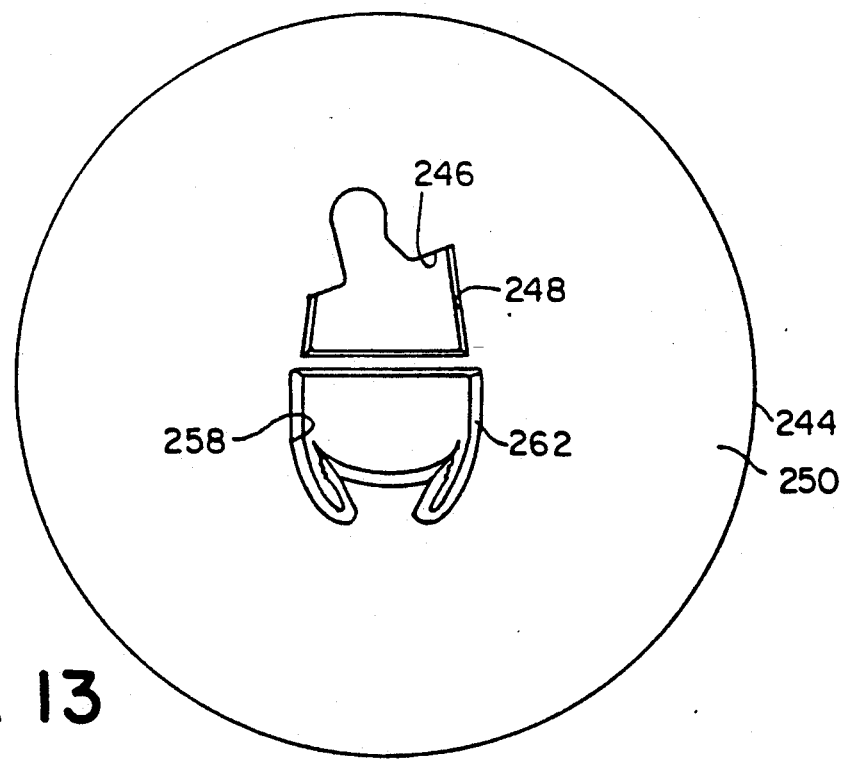
FIG. 13 is a greatly enlarged front elevational view of the fourth die plate (entrance view) of the die assembly of FIG. 3.
Figure 14:
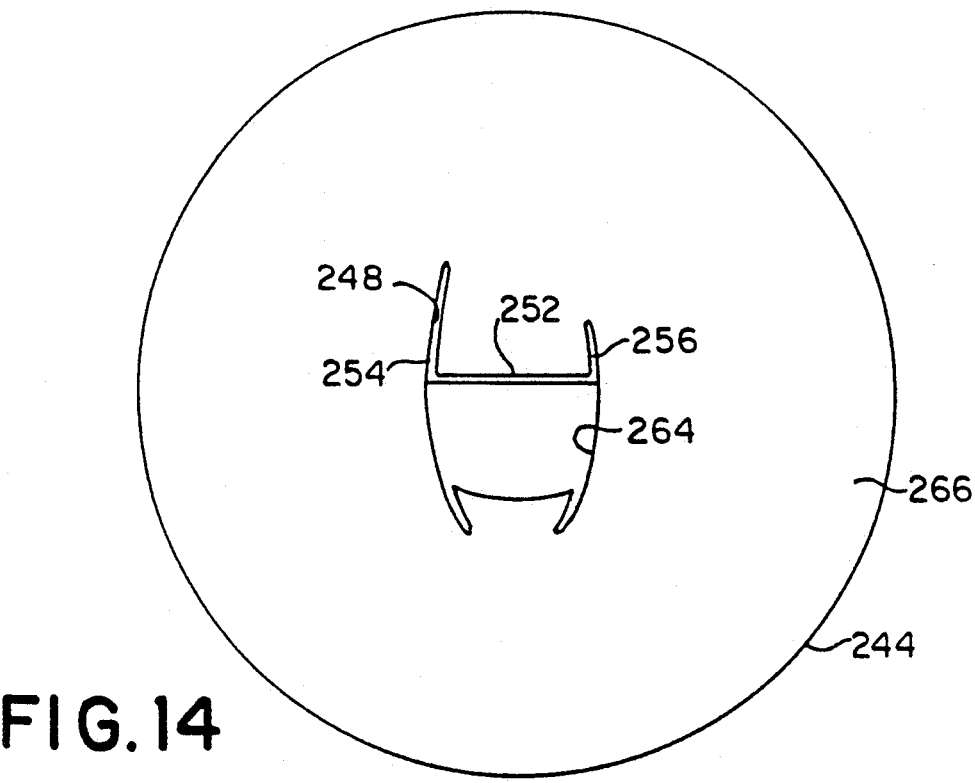
FIG. 14 is a greatly enlarged rear elevational view of the fourth die plate (exit view) of the die assembly of FIG. 3.

After emerging from the first aperture 234 in the third die plate 230, the first material fills the first cavity or groove 246 in the entrance surface 250 of the fourth die plate 244, as best shown in FIG. 13. The first groove 246 includes a first aperture 248 which extends through the fourth die plate 244 in a direction generally perpendicular to the entrance surface 250 of the fourth die plate 244. As best shown in FIG. 14, the first aperture 248 has a first portion 252 which defines the mounting plate 22 of the base member 20. A second portion 254 of the first aperture 248 defines the first clamping member 34. A third portion 256 of the first aperture 248 defines the second clamping member 34 of the base member 20.

Referring now to FIG. 13, after emerging from the bore 238 of the third die plate 230, the second material fills a second aperture 258 located in the fourth die plate 244 and extending therethrough. At the entrance surface 250 of the fourth die plate 244, the second aperture 258 generally corresponds in size and shape to the bore 238 of the third die plate 230. The second aperture 258 narrows through the transitional area 262 (best shown in FIG. 15) to narrow the size of the second aperture 264 as viewed from the exit side of the fourth die plate 244 (see FIG. 14). Referring now to FIG. 14, which shows the exit surface 266 of the fourth die plate 244, the second aperture 264 defines the first wall 38, first and second legs 44, 46, and the flexible members 48 of the sheath 36. The second aperture 264 receivably accommodates the insert 156 and mandrels 184 therein.

Referring now to FIGS. 4 and 6, after emerging from the first bore 158 of the insert 156, the first surface 100 of the first contact 98 is bonded, by the heat and pressure generated within the die assembly 132 during the coextrusion process, to the second surface 56 of the second wall 52 for securing the first contact 98 to the second wall 52. Likewise, the second surface 108 of the second contact 104 is similarly bonded to the first surface 76 of the third wall 74. Each of the first and second contacts 98, 104 is pulled through the insert 156 as the extrudate bonded to the contacts emerges from the die assembly 132. Therefore, the speed at which the extrusion process is carried out generally determines the rate at which each of the contacts 98, 104 is fed into the die assembly 132. After emerging from the exit surface 266 of the fourth die plate 244, the sheath 36 and base member 20 are bonded together by the heat and pressure generated within the die assembly 132 during the coextrusion process.

The sensing edge 16 which emerges from the fourth die plate 244 may be cooled by a conventional cooling means, such as a water bath, etc. as desired. The sensing edge 16 may be sliced or cut to a desired length corresponding generally to the length of the leading edge 18 of the door 14. In the alternative embodiment, the electrical wiring may be connected to the first and second contacts 98, 104 and the door controlling device, as previously discussed. Alternatively or additionally, electrical wiring may be manually inserted into any of the cavities as desired and connected to the contacts 98, 104, as is well known to those of ordinary skill in the art. Optionally, use of the second and fourth wires 111, 121 may be omitted and the second ends of the first and second contacts 98, 104 may be electrically connected to an interface board, end of line resistor, or diode (such as a zener diode) (not shown) which, in turn, is electrically connected to the controlling device. The end plugs (not shown) may be secured to the ends (not shown) of the sensing edge 16 to inhibit the entry of foreign matter and moisture or vapor into the ends of the sheath 36.

To summarize, the first material flows from the first extruder 128 through the first adaptor 134 and first conduit 144 of the first die plate 138 and emerges from the exit surface 139 of the first die plate 138. The first material then flows through the first aperture 176 which extends through the second die plate 174 and through the first aperture 234 which extends through the third die plate 230.

After emerging from the third die plate 230, the first material fills the first groove 246 of the fourth die plate 244 and flows through the first aperture 248 which extends therethrough. As the first material flows through the first aperture 248 of the fourth die plate 244, the first portion 252 thereof defines the mounting plate 22 of the base member 20. The second portion 254 of the first aperture 248 defines the first clamping member 34. The third portion 256 of the first aperture 248 defines the second clamping member 34 of the base member 20. Within the fourth die plate 244, the base member 20 is bonded to or coextruded with the sheath 36 to form the sensing edge 16.

To form the sheath 36, the second material is fed from the second extruder 130 through the second adaptor 136 and second conduit 148 of the first die plate 138. The second material flows from the second conduit 148 through the second aperture 150 to emerge from the first die plate 138 and enter the second die plate 174. The second material flows through the second aperture 180 in the second die plate 174 to substantially fill and flow through the groove 236 in the third die plate 230. The second material flows through the channels 242 of the groove 236 to fill the gaps between the insert 156 and mandrels 184 and the remainder of the bore 238 of the groove 236 surrounding the insert 156 and mandrels 184 to generally define the first, second and third walls 38, 52, 74, first and second legs 44, 46, flexible members 48, and the first and second cavity reinforcing walls 60, 86.

After emerging from the bore 238 of the groove 236 of the third die plate 230, the second material fills the second aperture 258, through which the insert 156 and mandrels 184 also extend. The second material next flows through the transitional area 262 and second aperture 264 to further define the first wall 38, first and second legs 44, 46 and the flexible members 48.

The first contact 98 is fed from the first supply reel 160 through the first bore 158 of the insert 156, which extends through the die assembly 132. After emerging from the first bore 158 of the insert 156, the first contact 98 is bonded to the second wall 52 of the sheath 36 within the fourth die plate 244, preferably by the heat generated during the coextrusion process and pressure generated by the angled notch 159.

Similarly, the second contact 104 is fed from the second supply reel 164 through the second bore 162 of the insert 156, which extends through the die assembly 132. After emerging from the second bore 162 of the insert 156, the second contact 104 is bonded to the third wall 74 of the sheath 36 within the fourth die plate, also preferably by the heat of the coextrusion process and pressure generated by the angled notch 161. The speed at which extrudate is formed and bonded to the contacts 98, 104 determines the speed at which each of the contacts is pulled through the die assembly 132 in the extrusion process.

In the alternative preferred embodiment, each of the first wire 110, second wire 111, third wire 120, and fourth wire 121, as desired, is fed from a supply reel (not shown) through the apertures 150 in the mandrel plate 152 and the apertures 149 in the first die plate 138. Each of the wires is then fed through corresponding apertures 186 in the mandrels 184 which extend through the second, third, and fourth die plates 174, 230, 244.

The sensing edge 16 which emerges from the fourth die plate 244 is preferably cooled and cut to the desired length and each of the electrical wires is electrically connected to the contacts as discussed above. If desired, end plugs may be secured to the ends of the sensing edge 16 and any other desired components, such as additional wiring or diodes, may be added. The sensing edge 16 may then be mounted to the leading edge 18 of a door 14 and connected to a control device. Discussion of the details of connecting the sensing edge to the control device have been omitted since it is not believed to be necessary to an understanding of the present invention and since such connections are within the ambit of one of ordinary skill in the art.

Thus, the present sensing edge 16 includes a plurality of internal cavities which extend along the length of the edge 16 to enhance the structural integrity of the sensing edge as well as to protect the electrical contacts, wiring, and connections from contamination by moisture, vapor, and foreign matter in the environment. By routing the electrical connections, etc., through the internal cavities, the life expectancy and durability of the connections and contacts is increased, providing a more reliable sensing edge 16. In addition to enhancing the structural integrity of the sensing edge, the second cavity reinforcing walls permit forces acting on the outside of the sheath to be transmitted to the first and second contacts to provide more precise engagement between the first and second contacts upon the application of force to the sheath.

The present invention also includes a method of forming the sensing edge by coextrusion of the base member and sheath. During the coextrusion process, the first and second contacts are bonded to the second and third walls within the sheath and associated electrical wiring may be inserted within the sheath. The present method of forming the sensing edge simplifies manufacturing and assembly of the sensing edge.

From the foregoing description, it can be seen that the present invention comprises a sensing edge for controlling movement of a door by actuation of a device upon force being applied to the sensing edge. It will be appreciated by those skilled in the art that changes could be made to the embodiment described above without departing from the broad inventive concepts thereof. It is understood, therefore, that this invention is not limited to the particular embodiment disclosed, but it is intended to cover all modifications which are within the spirit and scope of the invention as defined by the appended claims.

We claim:

1. A method for making a sensing edge for controlling movement of a door moving in a first direction by actuation of a device upon force being applied to the sensing edge, comprising the steps of:

feeding a first material to a die assembly for forming a generally rigid elongated base member for being secured to the door;

feeding a second material to the die assembly for forming a generally flexible elongated sheath comprising a first wall having a first surface and a second surface, the first surface of the first wall for being secured to the base member, a first leg and second leg extending from the second surface of the first wall, a second wall having a first surface and a second surface, the second wall being located generally parallel to and spaced from the first wall to define a first cavity therebetween, the second wall having a first end connected to the first leg and a second end connected to the second leg, and a third wall having a first surface and a second surface, the third wall being located generally parallel to and spaced from the second wall to define a second cavity therebetween, the third wall having a first end connected to the first leg and a second end connected to the second leg;

feeding a first flexible, electrically conductive contact to the die assembly for forming a first elongated contact having a first surface and a second surface and a first end and a second end;

bonding the first surface of the first contact to the second surface of the second wall for securing the first contact to the second wall;

feeding a second flexible, electrically conductive contact to the die assembly for forming a second elongated contact having a first surface and second surface and a first end and a second end;

bonding the second surface of the second contact to the first surface of the third wall opposite the first contact.

2. The method according to claim 1 wherein the step of feeding the second material to the die assembly further comprises forming a pair of first cavity reinforcing walls spaced from each other and extending between the first and second walls to define the first cavity therebetween, a first outer cavity between one of the first cavity reinforcing walls and the first leg and a second outer cavity between the other of the first cavity reinforcing walls and the second leg.

3. The method according to claim 2, further comprising the step of:

feeding a first electrically conductive wire and a second electrically conductive wire, each of the first and second wires having a first end and a second end, to the die assembly such that a portion of the second end of the first wire is positioned within the first outer cavity.

4. A method according to claim 3, further comprising the steps of:

inserting the second end of the first wire through an aperture in at least one of the second wall and the first cavity reinforcing wall which defines the first outer cavity;

electrically connecting the second end of the first wire to the first end of the first contact; and electrically connecting the second end of the second wire to the second end of the first contact.

5. The method according to claim 1, wherein the step of feeding the second material to the die assembly further comprises forming a pair of second cavity reinforcing walls spaced from each other and extending between the second and third walls to define the second cavity therebetween, a third outer cavity between one of the second cavity reinforcing walls and the first leg and a fourth outer cavity between the other of the second cavity reinforcing walls and the second leg.

6. The method according to claim 5, further comprising the step of:

feeding a third electrically conductive wire and a fourth electrically conductive wire, each of the third and fourth wires having a first end and a second end, to the die assembly such that a portion of the second end of the third wire is positioned within the third outer cavity.

7. A method according to claim 6, further comprising the step of:

inserting the second end of the third wire through an aperture in the second cavity reinforcing wall which defines the second outer cavity;

electrically connecting the second end of the third wire to the first end of the second contact; and electrically connecting the second end of the fourth wire to the second end of the second contact.

* * * * *